(12) United States Patent
Ali et al.

(10) Patent No.: US 8,689,131 B2
(45) Date of Patent: Apr. 1, 2014

(54) VISUAL CREATION OF COMPUTER-BASED WORKFLOWS

(75) Inventors: Alnur Ali, Kirkland, WA (US); Alexander Malek, Seattle, WA (US); Phillip Allen, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 786 days.

(21) Appl. No.: 12/357,056

(22) Filed: Jan. 21, 2009

(65) Prior Publication Data
US 2010/0185973 A1 Jul. 22, 2010

(51) Int. Cl.
*G06F 3/048* (2013.01)
*G06Q 10/00* (2012.01)

(52) U.S. Cl.
USPC .......................................... 715/781; 705/7.27

(58) Field of Classification Search
USPC ........................................................ 705/7.27
See application file for complete search history.

(56) References Cited

U.S. PATENT DOCUMENTS

| | | | |
|---|---|---|---|
| 5,774,661 A * | 6/1998 | Chatterjee et al. ............ | 709/203 |
| 6,493,731 B1 * | 12/2002 | Jones et al. ................... | 715/234 |
| 6,954,757 B2 | 10/2005 | Zargham et al. | |
| 7,051,071 B2 | 5/2006 | Stewart et al. | |
| 7,240,070 B1 | 7/2007 | Man Chen et al. | |
| 7,428,495 B2 | 9/2008 | Dhar et al. | |
| 7,752,556 B2 * | 7/2010 | Forstall et al. ................ | 715/761 |
| 7,934,165 B2 * | 4/2011 | Corona ......................... | 715/769 |
| 7,991,805 B2 * | 8/2011 | Vincent, III ................... | 707/804 |
| 2003/0090514 A1 | 5/2003 | Cole et al. | |
| 2003/0233374 A1 | 12/2003 | Spinola et al. | |
| 2004/0153466 A1 * | 8/2004 | Ziff et al. ...................... | 707/100 |
| 2004/0215552 A1 * | 10/2004 | Horn et al. ...................... | 705/38 |
| 2004/0268240 A1 * | 12/2004 | Vincent, III ................... | 715/513 |
| 2005/0066304 A1 * | 3/2005 | Tattrie et al. .................. | 717/101 |
| 2005/0188201 A1 * | 8/2005 | Sala et al. ..................... | 713/170 |
| 2005/0273763 A1 * | 12/2005 | Bendsen et al. ............... | 717/120 |

(Continued)

OTHER PUBLICATIONS

Andreas Hoheisel: "Grid Workflow Execution Service—Dynamic and Interactive Execution and Visualization of Distributed Workflows"; K-WfGrid: The Knowledge Base Workflow system for Grid Application, Proceedings of CGW, Oct. 2006, vol. II, pp. 13-24. ISBN 918-83-915141-8-4. http://www.first.fraunhofer.de/owx_medien/pdf/3462_Hoheisel_Andreas_2006_GWES-Paper_CGW06.pdf.

(Continued)

*Primary Examiner* — Matt Kim
*Assistant Examiner* — Ryan Barrett
(74) *Attorney, Agent, or Firm* — Tom Wong; Jim Ross; Micky Minhas (57) ABSTRACT

Embodiments are provided for creating and executing a custom action in a workflow generated by an application program executing on a computer system. The application program may receive a selection of a custom action to execute in the workflow in a user interface generated by the application program. The application program may translate the custom action into a user interface button for executing the custom action in the workflow. The application program may display the button for executing the custom action in the workflow. The application program may also resolve references to external content in a shared workflow document by communicating with a workflow engine to register a callback function for receiving a location of the shared workflow document on a remote computer system. The workflow engine may send the location of the shared workflow document to the application program to enable access to the external content.

16 Claims, 6 Drawing Sheets

(56) References Cited

U.S. PATENT DOCUMENTS

| | | |
|---|---|---|
| 2006/0021023 A1* | 1/2006 | Stewart et al. ............... 726/17 |
| 2006/0026506 A1* | 2/2006 | Kristiansen et al. .......... 715/517 |
| 2006/0070025 A1 | 3/2006 | Mauceri et al. |
| 2006/0129443 A1* | 6/2006 | Chen et al. ...................... 705/8 |
| 2006/0184883 A1* | 8/2006 | Jerrard-Dunne et al. ..... 715/742 |
| 2006/0242124 A1* | 10/2006 | Fields et al. ...................... 707/3 |
| 2006/0259524 A1* | 11/2006 | Horton ......................... 707/201 |
| 2007/0055729 A1* | 3/2007 | Lyle et al. .................... 709/204 |
| 2007/0055923 A1* | 3/2007 | Calow et al. ................. 715/505 |
| 2007/0179790 A1 | 8/2007 | Leitch et al. |
| 2007/0204012 A1* | 8/2007 | Kruse et al. ................. 709/219 |
| 2007/0250335 A1* | 10/2007 | Hodges et al. ................... 705/1 |
| 2008/0028363 A1* | 1/2008 | Mathew ....................... 717/104 |
| 2008/0040676 A1* | 2/2008 | Garg et al. .................... 715/762 |
| 2008/0155480 A1* | 6/2008 | Van Wyk et al. ............. 715/863 |
| 2008/0270597 A1 | 10/2008 | Tenenti |
| 2009/0083656 A1* | 3/2009 | Dukhon et al. ............... 715/781 |
| 2009/0106274 A1* | 4/2009 | Temple ......................... 707/100 |
| 2010/0049568 A1* | 2/2010 | Louie et al. ...................... 705/8 |
| 2010/0050153 A1* | 2/2010 | Louie et al. ................... 717/111 |
| 2010/0088618 A1* | 4/2010 | Mayer-Ullmann ........... 715/763 |
| 2010/0332271 A1* | 12/2010 | De Spong ......................... 705/7 |

OTHER PUBLICATIONS

Z. J. Muhsin et al.: "Web-based Workflow Management Information System for Computer Repair and Maintenance at the University of Jordan"; Computer System & Application. AICCSA, May 2007, pp. 92-99. http://fetweb.ju.edu.jo/staff/cpe/altaeem/SWEE_files/SWEEGSRC2008.pdf.

He Yanli et al.: "Towards an Agent and Knowledge Enacted Dynamic Workflow Management System for Intelligent Manufacturing Grid" CDVE 2006, LNCS 4101, pp. 75-82 http://www.springerlink.com/content/cn78105030420262/.

* cited by examiner

VISUAL CREATION OF COMPUTER-BASED WORKFLOWS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Many software applications allow users to create workflows (i.e., business processes) which may require input from multiple users in an online computing environment. For example, a workflow may be used to send an electronically generated expense report form which requires approval from one or more persons in a business unit. The workflow may provide options for the "approver" to either approve the expense report or alternatively, reject the expense report and return the form back to the requester for modification.

Current workflow software applications however, suffer from several drawbacks. One drawback is that workflows generated by current software applications are pre-defined and limit the actions which a user may make (e.g., the workflow may allow only "approve" or "reject" actions). Furthermore, custom actions (such as conditional approvals) cannot be added to predefined workflows without the writing of software code which is often beyond the expertise of all but the most technical of users (e.g., information technology professionals). As a result, less technical users (e.g., information workers) are unable to define custom workflow actions without learning to write software code and thus are limited to the actions provided in pre-defined workflows. Another drawback is that workflows generated by current software applications cannot be shared among diverse users in a shared computing environment due to various technical constraints, including an inability to track a current location of a workflow so that relevant data may be accessed in the shared environment. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for creating and executing a custom action in a workflow generated by an application program executing on a computer system. The application program may receive a selection of a custom action to execute in the workflow in a user interface generated by the application program. The application program may then translate the custom action into a user interface button for executing the custom action in the workflow. The application program may then display the button for executing the custom action in the workflow.

In another embodiment, a client application program may be used to resolve references to external content in a shared workflow document on a computer system. The client application program may communicate with a workflow engine to register a callback function for receiving a location of the shared workflow document on a remote computer system. The shared workflow document references the external content and may include an electronic business process form for receiving an approval of the business process, a conditional approval of the business process, a rejection of the business process, and an abstention of the business process. The workflow engine may determine a location from where the shared workflow document was opened on the remote computer system and send the location from where the shared workflow document was opened on the remote computer system to the application program to access the external content referenced in the shared workflow document.

In yet another embodiment, the application program may be utilized to display on a display device a user interface for creating a custom task in a workflow. The application program may display a first window in the user interface. The first window may include a button for adding one or more custom tasks to the workflow. The application program may be utilized to translate the one or more custom tasks into buttons for executing the one or more custom tasks in the workflow. The application program may also display a second window in the user interface. The second window may include a list of options associated with adding the one or more custom tasks to the workflow.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for creating and executing a custom action in a workflow generated by an application program executing on a computer system. The application program may receive a selection of a custom action to execute in the workflow in a user interface generated by the application program. The application program may then translate the custom action into a user interface button for executing the custom action in the workflow. The application program may then display the button for executing the custom action in the workflow.

In another embodiment, a client application program may be used to resolve references to external content in a shared workflow document on a computer system. The client application program may communicate with a workflow engine to register a callback function for receiving a location of the shared workflow document on a remote computer system. The shared workflow document references the external content and may include an electronic business process form for receiving an approval of the business process, a conditional approval of the business process, a rejection of the business process, and an abstention of the business process. The workflow engine may determine a location from where the shared workflow document was opened on the remote computer system and send the location from where the shared workflow document was opened on the remote computer system to the application program to access the external content referenced in the shared workflow document.

In yet another embodiment, the application program may be utilized to display on a display device a user interface for creating a custom task in a workflow. The application program may display a first window in the user interface. The first window may include a button for adding one or more custom tasks to the workflow. The application program may be utilized to translate the one or more custom tasks into buttons for executing the one or more custom tasks in the workflow. The application program may also display a second window in the user interface. The second window may include a list of options associated with adding the one or more custom tasks to the workflow. Referring now to the drawings, in which like numerals represent like elements, various illustrative embodiments will now be described.

Figure 1:
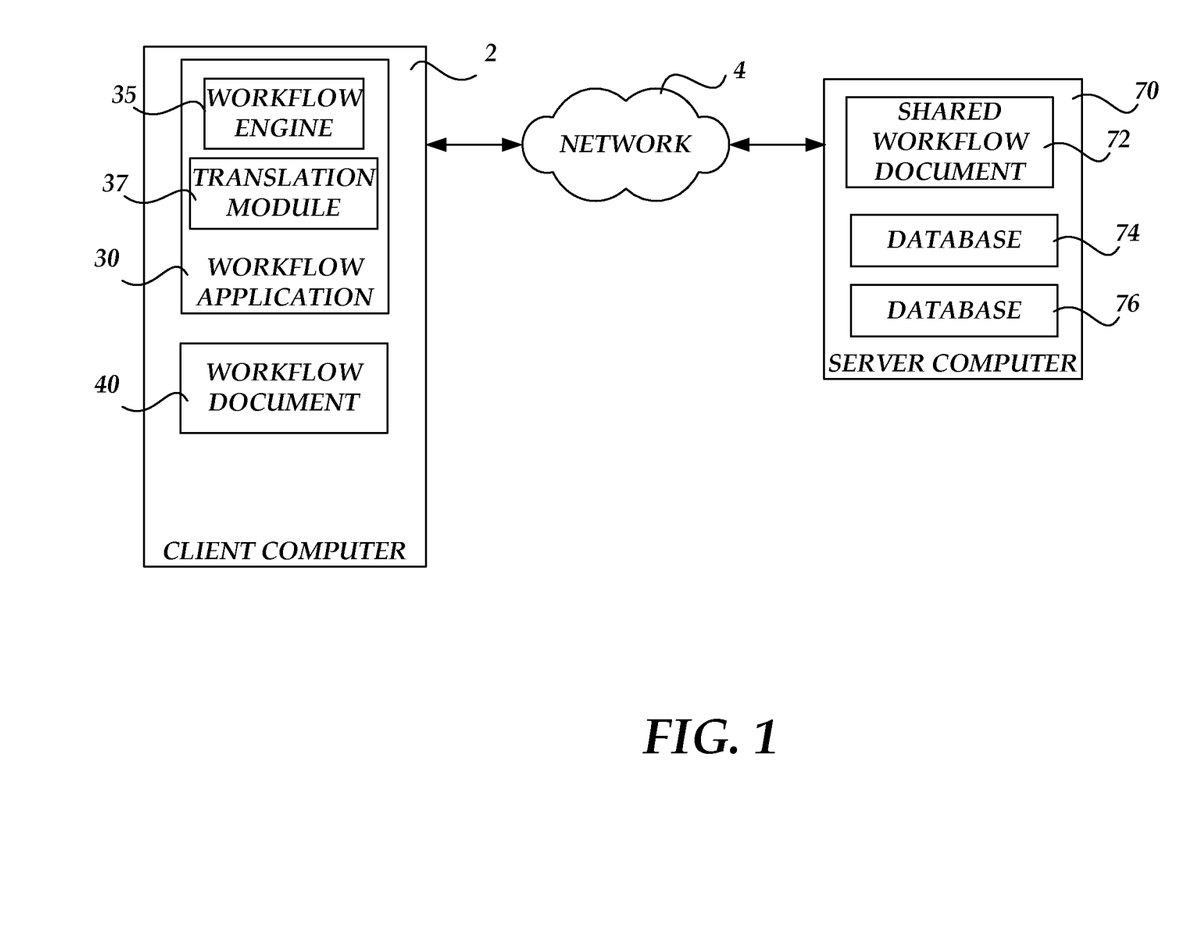
FIG. 1 is a block diagram illustrating a network architecture for the dynamic creation and sharing of computer-based workflows, in accordance with various embodiments.

FIG. 1 is a block diagram illustrating a network architecture for the dynamic creation and sharing of computer-based workflows, in accordance with various embodiments. The network architecture includes a client computer 2 in communication with a server computer 70 over a network 4. The client computer 2 may include a workflow application 30 which may be utilized to build or create workflows such as workflow document 40. As defined herein, a workflow may include a business process which may include, for example, approving an expense report or a procurement request. A workflow may be "built" or created by mapping the physical components of a business process onto their electronic counterparts. For example, a physical component of a workflow which includes the task of "talk to someone in Human Resources" may be mapped to "send an e-mail to Human Resources." In accordance with various embodiments, a workflow may also include "states" and "actions." As defined herein, a workflow state refers to a position in time during the execution of a workflow (e.g., "waiting on Human Resources for approval"). As defined herein, a workflow action refers to a set of tasks that may be performed at a particular workflow state. For example, at a particular state in Human Resources workflow, tasks for handling a request may include, but are not limited to, approve and reject. In accordance with various embodiments, and as will be described in greater detail below in the discussion of FIG. 3, the workflow application 30 may be configured to generate a user interface for creating custom actions (or tasks) for execution in a workflow represented by the workflow document 40. The workflow application 30 includes a workflow engine 35. As will be described in greater detail below in the discussion of FIGS. 3-4, the workflow engine 35 includes program code for maintaining a workflow state and registering a callback function for executing workflow actions.

The workflow application 30 may also include a translation module 37. In accordance with various embodiments, the translation module 37 may include program code for creating workflow documents (i.e., electronic forms) and translating actions (including custom actions) created by the workflow application 30 into user interface buttons for executing the actions in a workflow document. The server computer 70 in the networked environment may include a shared workflow document 72 and databases 74 and 76. In accordance with various embodiments, the shared workflow document 72 may be an electronic business process form representing a workflow which is shared in a collaborative computing environment of disparate users. For example, the shared workflow document 72 may be used as a template by two different groups in a business organization (e.g., Human Resources and Accounting). Thus, the shared workflow document 72 may be accessed using different file paths on the server computer 70 which are used by each group. In accordance with an embodiment, the workflow engine 35 may be configured to register a callback function for receiving the location (or relative path) of the shared workflow document 72 on the server computer 70 so that an appropriate database 74 or 76 may be accessed to retrieve external content associated with the shared workflow document 72 by a user.

Exemplary Operating Environment

Figure 2:
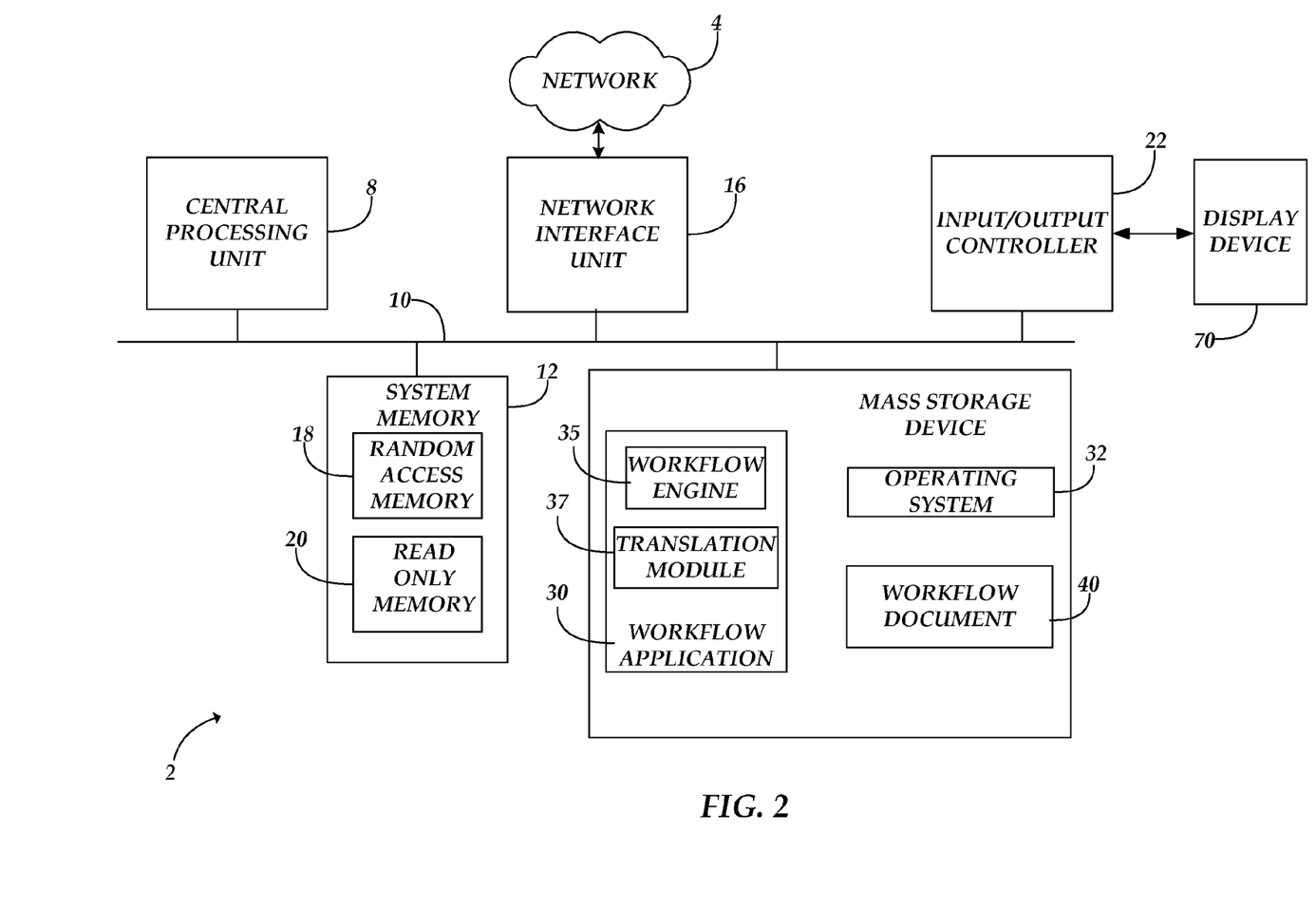
FIG. 2 is a block diagram illustrating a computing environment which may be utilized for the dynamic creation and sharing of computer-based workflows, in accordance with various embodiments.

Referring now to FIG. 2, the following discussion is intended to provide a brief, general description of a suitable computing environment in which various illustrative embodiments may be implemented. While various embodiments will be described in the general context of program modules that execute in conjunction with program modules that run on an operating system on a personal computer, those skilled in the art will recognize that the various embodiments may also be implemented in combination with other types of computer systems and program modules.

Generally, program modules include routines, programs, components, data structures, and other types of structures that perform particular tasks or implement particular abstract data types. Moreover, those skilled in the art will appreciate that the various embodiments may be practiced with other computer system configurations, including hand-held devices, multiprocessor systems, microprocessor-based or programmable consumer electronics, minicomputers, mainframe computers, and the like. The various embodiments may also be practiced in distributed computing environments where tasks are performed by remote processing devices that are linked through a communications network. In a distributed computing environment, program modules may be located in both local and remote memory storage devices.

FIG. 2 shows the computer 2 which may include a general purpose desktop, laptop, handheld, tablet, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20.

The computer 2 further includes a mass storage device 14 for storing an operating system 32, the workflow application 30, and the workflow document 40. As discussed above with respect to FIG. 1, the workflow application 30 may include the workflow engine 35 and the translation module 37.

In accordance with various embodiments, the operating system 32 may be suitable for controlling the operation of a networked personal computer, such as the WINDOWS operating systems from MICROSOFT CORPORATION of Redmond, Wash. The workflow application 30 may comprise various productivity application programs including, but not limited to, word processing application programs, spreadsheet application programs and information gathering programs which are used in the creation and routing (e.g., via electronic mail) of electronic documents. Illustrative productivity application programs may include, but are not limited to, the WORD, EXCEL, POWERPOINT, and INFOPATH productivity application programs from Microsoft Corporation of Redmond, Wash.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2. By way of example, and not limitation, computer-readable media may comprise computer storage media and communication media.

Computer storage media includes volatile and non-volatile, removable and non-removable hardware storage media implemented in any physical method or technology for the storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, which can be used to store the desired information and which can be accessed by the computer 2. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as a computer program product.

According to various embodiments of the invention, the computer 2 may operate in a networked environment using logical connections to remote computers through a network 4, such as a local network or a wide area network (e.g., the Internet), for example. The computer 2 may connect to the network 4 through a network interface unit 16 connected to the bus 10. It should be appreciated by those skilled in the art that when operating in a networked environment, the computer 2 may be in communication with one or more remote servers (such as the server computer 70 shown in FIG. 1) hosting a shared services platform such as the SHAREPOINT SERVER platform from Microsoft Corporation of Redmond, Wash. It should be appreciated that the network interface unit 16 may also be utilized to connect to other types of networks and remote computing systems. The computer 2 may also include an input/output controller 22 for receiving and processing input from a number of input types, including a keyboard, mouse, pen, stylus, finger, and/or other means. Similarly, an input/output controller 22 may provide output to a display device 70, a printer, or other type of output device. Additionally, a touch screen can serve as an input and an output mechanism.

Figure 3:
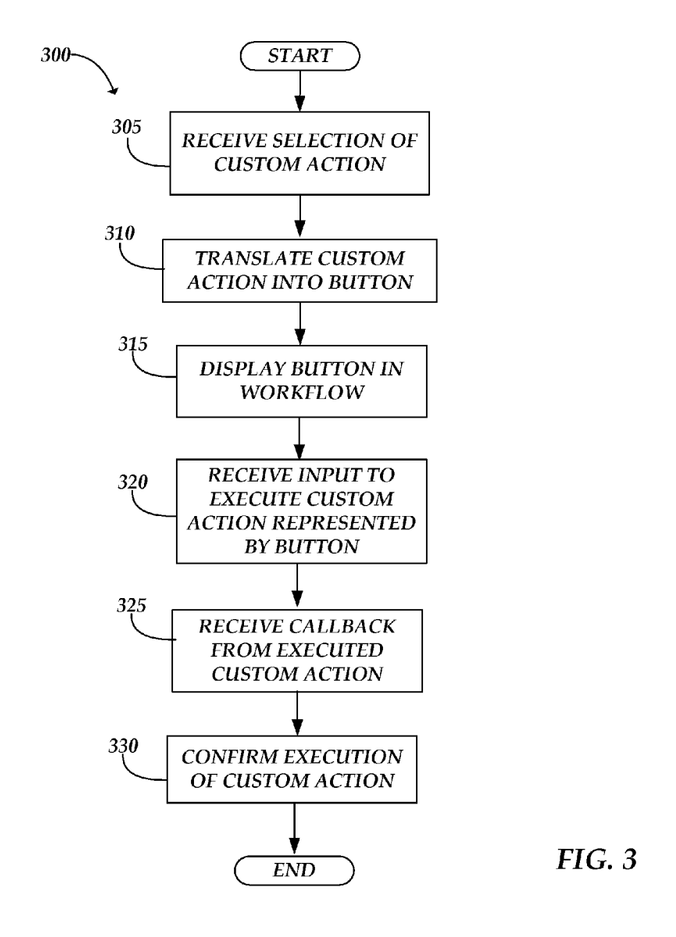
FIG. 3 is a flow diagram illustrating a routine for creating and executing a custom action in a workflow, in accordance with an embodiment.

FIG. 3 is a flow diagram illustrating a routine 300 for creating and executing a custom action in a workflow, in accordance with an embodiment. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIGS. 3-4 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

Figure 5:
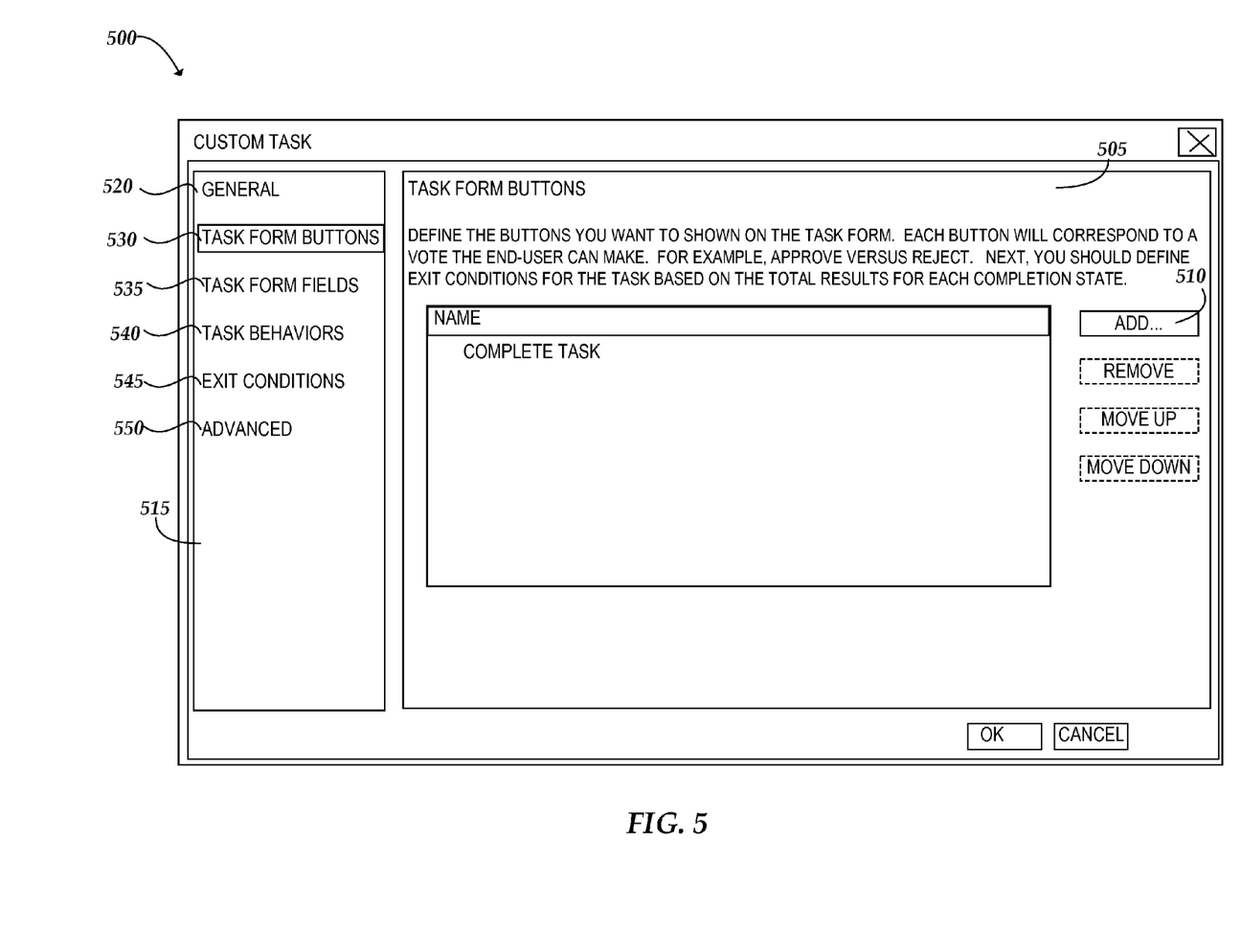
FIG. 5 is a computer screen display of a user interface which may be utilized for creating custom tasks (actions) for use in a workflow, in accordance with an embodiment.

The routine 300 begins at operation 305, where the workflow application 30 executing on the computer 2 receives a selection of a custom action (in a user interface) to execute in the workflow document 40. In particular, the workflow application 30 may receive a user preference for defining a custom action for a workflow such as "Conditional Approval" or "Abstain" with respect to a workflow state comprising an approval request. In accordance with an embodiment, the workflow application 30 may receive a user preference to add one or more custom actions to a set of actions previously defined for the workflow by the workflow application 30. FIG. 5 (discussed below) shows an illustrative user interface generated by the workflow application 30 for adding custom actions to a workflow and FIG. 6 (discussed below) shows an illustrative workflow displaying custom actions defined for a workflow.

From operation 305, the routine 300 continues to operation 310, where the workflow application 30 translates the custom action into a user interface button for executing the custom action in the workflow document 40. In particular, the workflow application 30 may pass the one or more preferences defining the custom action (made at operation 305) to the translation module 37 to create a user interface button corresponding to the custom action.

From operation 310, the routine 300 continues to operation 315, where the workflow application 30 displays, in the workflow document 40, the user interface button for executing the custom action. In particular, the workflow application 30 may be configured to add the user interface button to a workflow state (such as a request for approval) displayed in the workflow document 40. In accordance with an embodiment, the user interface button (which may alternatively be referred to herein as a user interface control) is created by the translation module 37. The translation module 37 may be configured as a form generator to programmatically generate a layout for an electronic business process form. In order to accomplish this, the translation module 37 may utilize a form schema (not shown) for the electronic form. The form schema defines the data fields for the electronic form and the data type for each of the specified data fields. The translation module 37 may utilize the form schema and a mapping between data types and appropriate user interface controls for each data type to determine the user interface controls to be utilized for the form. It will be appreciated that the mapping may be pre-defined or dynamically generated. For example, the translation module 37 may utilize mapping data (not shown) comprising a data type field and a user interface control field. In this manner, the mapping data identifies the appropriate user interface control to be utilized for each data type. The mapping data is consulted by the translation module 37 to identify the appropriate user interface controls for each of the fields specified by the form schema. Each of these controls is then added to the form by the translation module 37. Once the user interface controls have been identified, the translation module 37 creates the electronic form such that it can collect the desired data (e.g., "Conditional Approval" or "Abstain" for a workflow) using the identified user interface controls. The functionality of the translation module 37 with respect to creating user interface controls in a form is described in greater detail in related patent application U.S. Ser. No. 11/861,271 entitled "Ubiquitous Electronic Forms," filed on Sep. 25, 2007, the disclosure of which is incorporated herein, in its entirety, by reference.

From operation 315, the routine 300 continues to operation 320, where the workflow application 30 receives an input to execute the custom action represented by the user interface button in the workflow document 40. For example, a user may open the workflow document 40 in the workflow application 30 and click on a user interface button indicating that the user wishes to make a conditional approval of an approval request (e.g., "approve, pending requester makes a change to his request—such as ordering<five whiteboards").

From operation 320, the routine 300 continues to operation 325, where the workflow application 30 receives a callback from the executed custom action. In particular, the workflow flow engine 35 in the workflow application 30 may register a callback function with the user interface button and receive a callback after the button is pressed by a user in the workflow document 40. It should be understood that in the art of computer programming, a "callback" is executable code that is passed as an argument to other code. It allows a lower-level software layer to call a subroutine (or function) defined in a higher-level layer. Usually, the higher-level code starts by calling a function within the lower-level code, passing to it a pointer or handle to another function. The lower-level function may register the passed-in function as a handler that is to be called asynchronously by the lower-level at a later time in reaction to the occurrence of an event. Callback functions are well-known to those skilled in the art, and therefore are not discussed in further detail herein.

From operation 325, the routine 300 continues to operation 330, where the workflow application 30 confirms that the custom action was executed (i.e., the user interface button was pressed) at operation 320. In particular, the workflow engine 35 (which as discussed above maintains a current state of a workflow) may update the current state for the workflow document 40 to reflect that the custom action was executed. From operation 330, the routine 300 then ends.

Figure 4:
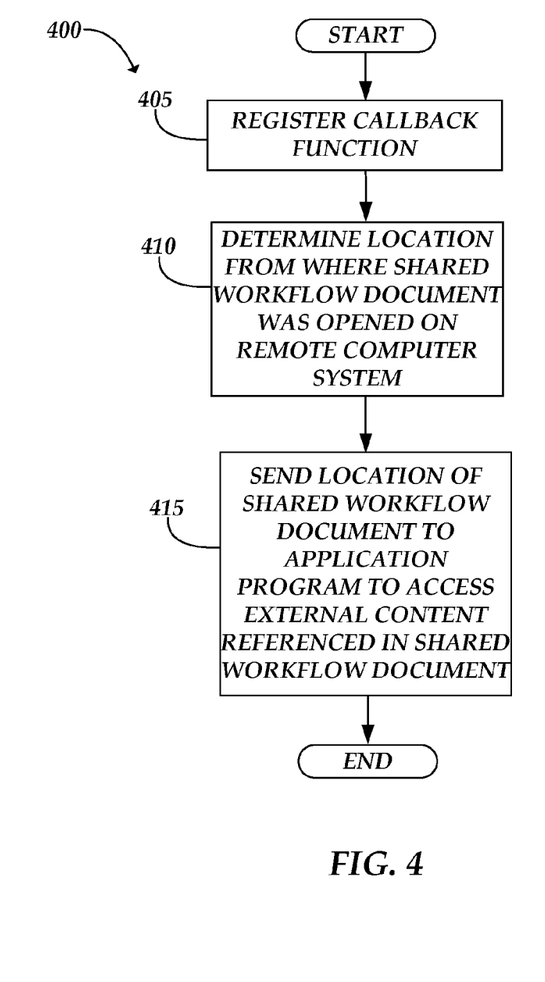
FIG. 4 is a flow diagram illustrating a routine for resolving references to external content in a shared workflow document, in accordance with an embodiment.

FIG. 4 is a flow diagram illustrating a routine 400 for resolving references to external content in a shared workflow document, in accordance with an embodiment. The routine 400 begins at operation 405, where the workflow application 30 communicates with the workflow engine 35 to register a callback function for receiving a location (i.e., the file path) of the shared workflow document 72 on the server computer 70.

From operation 405, the routine 400 continues to operation 410, where the workflow engine 35 in the workflow application 30 determines a location (i.e., file path) from where the shared workflow document 72 was opened on the server computer 70. In particular, the workflow engine 35 may receive a callback from the shared workflow document 72 which identifies the location (i.e., file path) of the shared workflow document 72 on the server computer 70. It will be appreciated that, in accordance with an embodiment, the shared workflow document 72 may comprise instructions to check with the workflow engine 35 on the location from which to retrieve external content (which may be stored, for example, in one of the databases 74 and 76).

From operation 410, the routine 400 continues to operation 415, where the workflow engine 35 sends the location from where the shared workflow document 72 was opened on the server computer 70 to access the external content. In particular, the location may comprise the relative file path to where the shared workflow document 72 is currently being used on the server computer 70. From operation 435, the routine 400 then ends.

FIG. 5 is a computer screen display of a user interface 500 which may be utilized for creating custom tasks (actions) for use in a workflow, in accordance with an embodiment. The user interface 500 is generated by the workflow application 30 and includes a Task Form Buttons window 505 for defining buttons for display in a workflow document or task form. The buttons may correspond to votes an end user The window 505 also includes an Add button for adding custom tasks to a workflow. The user interface 500 also includes a window 515 which lists options associated with the adding of custom tasks to a workflow. The options include a General option 520, a Task Form Buttons option 530 (for displaying the Task Form Buttons window 505), a Task Form Fields option 535 for displaying fields in a workflow, a Task Behaviors option 540, an Exit Conditions option 545 (for defining an exit condition for a custom task after the task has been completed), and an Advanced option 550.

Figure 6:
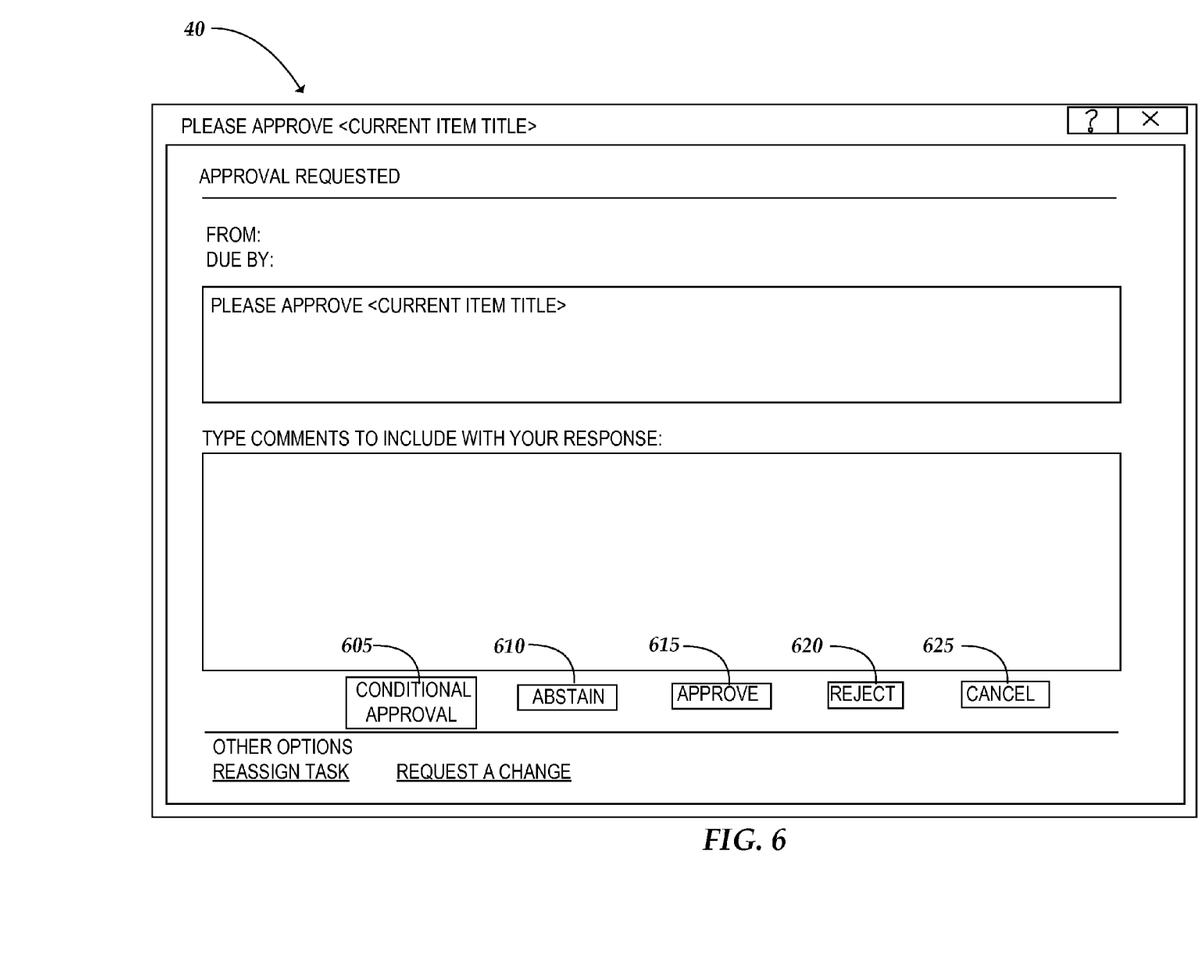
FIG. 6 is a computer screen display of a workflow document which may be utilized to execute custom actions, created in the user interface of FIG. 5, for a workflow, in accordance with an embodiment.

FIG. 6 is a computer screen display of the workflow document 40 which may be utilized to execute custom actions, created in the user interface of FIG. 5, for a workflow, in accordance with an embodiment. The workflow document 40 includes user interface buttons which may include, but are not limited to, a Conditional Approval button 605, an Abstain button 610, an Approval button 615, a Reject button 620, and a Cancel button 625. The Conditional Approval button 605 and the Abstain button 610 may represent custom tasks or actions added to the workflow document 40 by a user while the Approve button 615, the Reject button 620, and the Cancel button 625 may represent predefined tasks included in an internal list of possible actions which are automatically populated when the workflow document 40 is generated by the workflow application 30. It will further be appreciated that the shared workflow document 72 (discussed above) may also contain the same or additional user interface buttons discussed above with respect to the workflow document 40.

Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer-implemented method for creating and executing a custom action in a workflow generated by an application program executing on a computer system, comprising:

receiving, in a user interface generated by the application program, a selection of the custom action to execute in the workflow by receiving at least one preference for defining the custom action in the user interface;

translating, utilizing a translation module, the custom action into a button for executing the custom action in the workflow, the translation module utilizing a form schema and a dynamically generated mapping between data types and one or more user interface controls for each of the data types, the custom action comprising one or more of the following: conditional approval and abstain, wherein translating the custom action into a button for executing the custom action in the workflow comprises passing the at least one preference defining the custom action to a translation module in the application program to create the button corresponding to the custom action, wherein creating the button comprises consulting mapping data to identify a user interface control for a data type field specified by the form schema, the mapping data comprising the data type field and a user interface control field, the translation module being configured as a form generator to programmatically generate a layout for an electronic business process form, the translation module being utilized to add the button to the electronic business process form; and displaying, in the workflow generated by the application program, the button for executing the custom action in the workflow, the workflow comprising one or more user interface buttons representing predefined tasks which are automatically populated in an internal action list when the workflow is generated by the application program.

2. The method of claim 1 further comprising:

receiving an input to execute the custom action represented by the button in the workflow;

in response to receiving the input to execute the custom action represented by the button, receiving a callback from the executed custom action in the application program; and in response to receiving the callback, confirming that the custom action was executed in the application program.

3. The method of claim 1, wherein receiving at least one preference for defining the custom action in the user interface comprises receiving a preference to make a conditional approval of the workflow, the workflow comprising an electronic form defining a business process.

4. The method of claim 1, wherein receiving at least one preference for defining the custom action in the user interface comprises receiving a preference to abstain from submitting an approval or a rejection of the workflow, the workflow comprising an electronic form defining a business process.

5. The method of claim 1, wherein receiving at least one preference for defining the custom action in the user interface comprises receiving at least one preference to add the custom action to a plurality of actions previously defined for the workflow.

6. The method of claim 2, wherein receiving a callback from the executed custom action in the application program comprises:

registering a callback function with the button for executing the action in a workflow engine in the application program; and receiving the callback in the workflow engine, wherein the workflow engine maintains a current state for the workflow.

7. The method of claim 6, wherein confirming that the custom action was executed in the application program comprises updating the current state for the workflow in the workflow engine to reflect that the custom action was executed.

8. A device comprising a processor and computer-executable instructions which, when executed on a computer, will cause the computer to perform a method of displaying on a display device a user interface for creating a custom task in a workflow generated by an application program executing on the computer, the method comprising:

displaying a first window in the user interface comprising a button for adding at least one custom task to the workflow, wherein the application program utilizes a translation module to translate the at least one custom task into a button for executing the at least one custom task in the workflow, the translation module utilizing a form schema and a dynamically generated mapping between data types and one or more user interface controls for each of the data types, the at least one custom task comprising one or more of the following: conditional approval and abstain, wherein translating the at least one custom task into a button for executing the at least one custom task in the workflow comprises passing the at least one preference defining the at least one custom task to a translation module in the application program to create the button corresponding to the at least one custom task, wherein creating the user interface button comprises consulting mapping data to identify a user interface control for a data type field specified by the form schema, the mapping data comprising the data type field and a user interface control field, the translation module being configured as a form generator to programmatically generate a layout for an electronic business process form, the translation module being utilized to add the button to the electronic business process form; and displaying a second window in the user interface comprising a list of options associated with adding the at least one custom task to the workflow, the workflow comprising one or more user interface buttons representing predefined tasks which are automatically populated in an internal action list when the workflow is generated by the application program.

9. The device of claim 8, wherein the at least one custom task comprises a vote an end user makes concerning the workflow.

10. The device of claim 8, wherein the list of options associated with adding the at least one custom task to the workflow comprises an option for defining an exit condition for the at least one custom task after the at least one custom task has been completed.

11. The device of claim 8, wherein the list of options associated with adding the at least one custom task to the workflow comprises an option for defining task form buttons for displaying in the workflow.

12. The device of claim 8, wherein the list of options associated with adding the at least one custom task to the workflow comprises an option for defining task form fields for displaying in the workflow.

13. The device of claim 8, wherein the list of options associated with adding the at least one custom task to the workflow comprises an option for defining task behaviors associated with the workflow.

14. The device of claim 10, wherein the exit condition comprises ending a business process defined by the workflow.

15. A device comprising a processor and computer-executable instructions which, when executed on a computer, will cause the computer to perform a method for creating and executing a custom action in a workflow generated by an application program executing on a computer system, the method comprising:
receiving, in a user interface generated by the application program, a selection of the custom action to execute in the workflow by receiving at least one preference for defining the custom action in the user interface;
translating, utilizing a translation module, the custom action into a button for executing the custom action in the workflow, the translation module utilizing a form schema and a dynamically generated mapping between data types and one or more user interface controls for each of the data types, the custom action comprising one or more of the following: conditional approval and abstain, wherein translating the custom action into a button for executing the custom action in the workflow comprises passing the at least one preference defining the custom action to a translation module in the application program to create the button corresponding to the custom action, wherein creating the button comprises consulting mapping data to identify a user interface control for a data type field specified by the form schema, the mapping data comprising the data type field and a user interface control field, the translation module being configured as a form generator to programmatically generate a layout for an electronic business process form, the translation module being utilized to add the button to the electronic business process form;
displaying, in the workflow generated by the application program, the button for executing the custom action in the workflow, the workflow comprising one or more user interface buttons representing predefined tasks which are automatically populated in an internal action list when the workflow is generated by the application program;
receiving an input to execute the custom action represented by the button in the workflow;
in response to receiving the input to execute the custom action represented by the button, receiving a callback from the executed custom action in the application program; and
in response to receiving the callback, confirming that the custom action was executed in the application program.

16. The device of claim 15, wherein receiving a callback from the executed custom action in the application program comprises:
registering a callback function with the button for executing the action in a workflow engine in the application program; and
receiving the callback in the workflow engine, wherein the workflow engine maintains a current state for the workflow.

* * * * *